(No Model.)
C. A. COOPER.
HAND PLANTER FOR SEED AND FERTILIZER.
No. 261,834.  Patented Aug. 1, 1882.
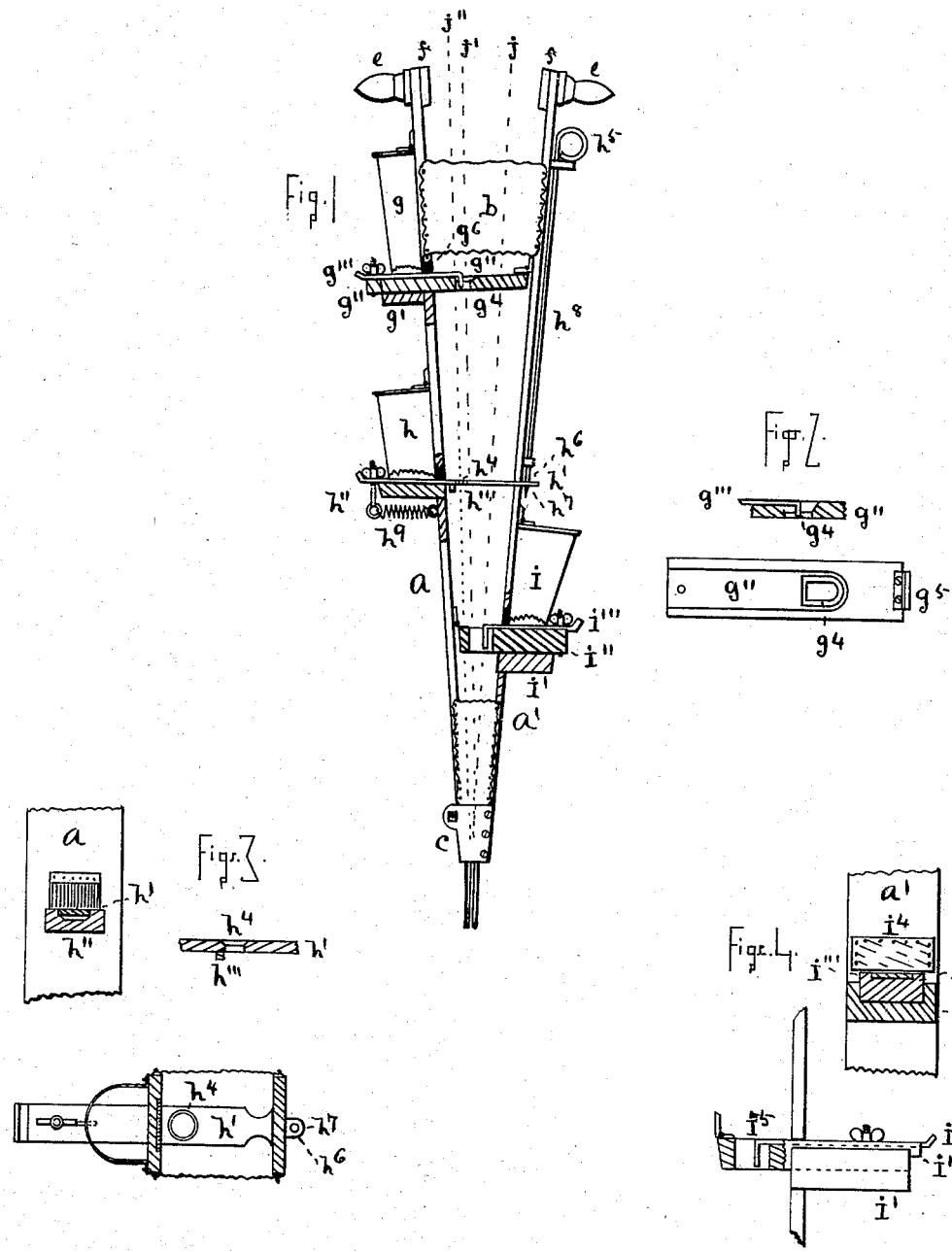

UNITED STATES PATENT OFFICE.

CHARLES A. COOPER, OF DANBY, NEW YORK.

HAND-PLANTER FOR SEED AND FERTILIZERS.

SPECIFICATION forming part of Letters Patent No. 261,834, dated August 1, 1882.

Application filed March 26, 1881. (No model.)

*To all whom it may concern:*

Be it known that I, CHARLES ALANSON COOPER, of Danby, (with post-office at Ithaca, N. Y.,) Tompkins county, New York, have invented an Improved Hand-Planter for Seeds and Fertilizers, of which the following is a specification, reference being had to the accompanying drawings.

My invention relates to the seed and fertilizer holders, and to the manner of feeding the same into the tubular part of the planter, which will be apparent as I describe my implement.

Figure 1 is a side elevation of my implement, the left-hand end being considered the front, parts being removed to show its construction. Fig. 2 represents parts of my corn-feeding slide. Fig. 3 represents parts of the pumpkin-seed feeder, and Fig. 4 shows the detached slide and parts of the fertilizer-feeder.

In the figures, $a$ is the front wooden wall of the planter, and $a'$ the rear wall, the two sides being closed by the cloths $b$, which are in part cut away to show the inside of the tube. Parts also of the wooden walls and the bottoms of the seed-cups are cut away about the feed-slides. The top spread of the end walls is some six inches, expanding from the hinge-plate $c$ at their lower ends, which are held apart half an inch, or more, below which are the ground plunging-plates. The blocks $f$ prevent full closure at the top. There are three seed-cups, the top one, $g$, for the corn, the middle one, $h$, for pumpkin-seeds, and the lower one, $i$, for fertilizers. They all are composed of three parts, the slide, the adjustable plates, and the fixed base-plates, (though the middle or pumpkin-seed feed-slide has only two parts,) which will be seen in the construction of the corn-feed. This has a fixed base, $g'$, a wood hinged slide, $g''$, and an adjustable plate, $g'''$. The corn at each closing of the walls of the planter enters the D-shaped orifice $g^4$, regulated by the adjustable plate $g'''$, and escapes at each opening of the walls. The sides of the D-shaped orifice are beveled at the top partially downward, which is done, as shown, to facilitate the bristle brush (similar to that seen in Fig. 3) to sweep off the superfluous kernels of corn as the orifice emerges out of the hopper $g$. When the orifice enters the tube the corn falls out of the orifice.

The middle feeder is seen in Figs. 1 and 3, and consists of the base $h''$, beneath the pumpkin-seed hopper $h$, the metallic slide $h'$, which slide has a projection, $h'''$, and an orifice, $h^4$, and which slide has the functions both of the wood slide and the adjustable plates of the other hoppers. The orifice $h^4$ is a plain round opening, with its upper part beveled, as in the base-slide device of the corn-hopper. The projection slides in a groove in the base-block and sweeps the seeds clear of the base. A brush sweeps the top of the slide. This beveled and round orifice, and groove in the base beneath it, if properly made, feeds two or more seeds, or only one, as often as the hand-ring $h^5$, pushed downward, enters the point $h^7$ of the rod $h^8$ into the aperture $h^6$ in the end of the slide $h'$. When the operator pulls up the rod by its ring the slide is inoperative.

Figs. 1 and 4 show the fertilizer hopper and feed, which is composed of the hopper $i$, the inclosing-base $i'$, feed-slide $i''$, and adjustable plate $i'''$, the plate and slide being swept by the india-rubber-cloth brush $i^4$, the operation of these several named parts being apparent to those familiar with the state of the art of making hand-planters, and by what has been said of the corn and pumpkin-seed devices above described.

In Fig. 1 three dotted lines are seen extending from the hinge-plate $c$ upward. The right-hand dotted line, $j$, shows that when the two walls $a$ $a'$ have moved apart the distance from the wall $a'$ to the line $j$ the major part of the fertilizers have fallen, because the orifice $i^5$ is then within the tube. The left-hand line, $j'''$, shows that when the walls $a$ $a'$ have moved apart the distance of the space between the wall $a'$ and the line $j''$ then the pumpkin-seeds fall, being the last of all dropped; and the intermediate line, $j'$, being reached, which is before the pumpkin-seed line, by the separation of the walls $a$ $a'$ the orifice $g^4$ is opened and the corn falls. By this arrangement, which is a plan of adjustment of the distances of the orifices from the hinges, by which the slides are made fast to the walls $a$ $a'$, (for the rod $h^8$ acts as a hinge,) the fertilizers fall first, the corn next, and the pumpkin-seeds last, which is an order quite desirable.

The set-screws of the adjustable plates need no description, nor other parts which are well known in this class of planters.

The set-screw of the pumpkin-seed feed is useful when it is desirable to shut off the pumpkin-seed feed for any long time.

The advantages and uses of my invention are apparent.

I claim—

1. The pumpkin-seed slide $h'$, provided with a circular feed-orifice having its upper edge beveled, and with a projection, $h'''$, which sweeps the groove in the base-block $h''$, and with an aperture, $h^6$, in the end of the slide farthest from the hopper $h$, in combination with the rod $h^8$ and spring $h^9$, said slide having in itself the functions of an adjustable plate feed-slide and of the groove-scraper, and being always ready to be operated by the ring $h^5$, near one of the handles of the implement, as shown and described.

2. In a combined corn and pumpkin-seed planter and fertilizer-distributer, the combination of the hoppers $g$, $h$, and $i$, and their feed-slides placed at intervals one above the other and constructed with adjustable feed-orifices, whereby as the end boards, $a\ a'$, are opened the fertilizer falls first, the corn next, and the pumpkin-seeds last, as shown and described.

3. In a combined corn and pumpkin-seed planter and fertilizer-distributer, having hoppers $g$, $h$, and $i$, placed one above the other, and dropping the fertilizer first, the corn next, and the pumpkin-seeds last, the combination of feed-slides constructed with beveled upper edges to the feed-orifices, and with perpendicular walls to the lower part of the feed-orifices below the beveled upper edges, the beveled edges facilitating the separation of the quantity to be fed from the contents of the hopper, and the lower perpendicular walls retaining the seed and fertilizer in the slides, as set forth.

CHARLES ALANSON COOPER.

Witnesses:
S. J. PARKER,
CHS. G. DAY.